United States Patent
Matsunaga

[11] Patent Number: 5,973,752
[45] Date of Patent: Oct. 26, 1999

[54] GHOST REMOVAL APPARATUS

[75] Inventor: Mitsuhiro Matsunaga, Tokyo, Japan

[73] Assignee: NEC Corporation, Tokyo, Japan

[21] Appl. No.: 08/879,772

[22] Filed: Jun. 20, 1997

[30] Foreign Application Priority Data

Jun. 20, 1996 [JP] Japan .................................. 8-159954

[51] Int. Cl.$^6$ .................................................. H04N 5/21
[52] U.S. Cl. ........................................... 348/614; 348/607
[58] Field of Search ................................ 348/614, 611, 348/608, 607, 617, 914, 612; 358/167; H04N 5/21, 5/13, 5/208, 5/213

[56] References Cited

U.S. PATENT DOCUMENTS

| | | | |
|---|---|---|---|
| 5,161,017 | 11/1992 | Sato | 358/166 |
| 5,179,444 | 1/1993 | Koo | 358/187 |
| 5,267,041 | 11/1993 | Matsunaga | 358/167 |
| 5,285,279 | 2/1994 | Sakamoto et al. | 348/614 |
| 5,299,004 | 3/1994 | Joo et al. | 348/614 |
| 5,309,226 | 5/1994 | Matsunaga | 348/614 |
| 5,341,177 | 8/1994 | Roy et al. | 348/614 |
| 5,361,102 | 11/1994 | Roy et al. | 348/611 |
| 5,363,144 | 11/1994 | Park | 348/614 |
| 5,389,977 | 2/1995 | Lee | 348/614 |
| 5,481,316 | 1/1996 | Patel | 348/614 |
| 5,568,202 | 10/1996 | Koo | 348/611 |
| 5,600,380 | 2/1997 | Patel et al. | 348/614 |
| 5,623,318 | 4/1997 | Lee | 348/614 |
| 5,623,320 | 4/1997 | Rim | 348/614 |

FOREIGN PATENT DOCUMENTS

| | | |
|---|---|---|
| 2-265381 | 10/1990 | Japan . |
| 4-74066 | 3/1992 | Japan . |
| 4-177979 | 6/1992 | Japan . |
| 4-196771 | 7/1992 | Japan . |
| 7-95447 | 4/1995 | Japan . |

*Primary Examiner*—Michael H. Lee
*Assistant Examiner*—Jean W. Désir
*Attorney, Agent, or Firm*—Foley & Lardner

[57] ABSTRACT

A ghost removal apparatus to prevent visual emphasis of image noises when removing ghosts. A transparent characteristic of an image signal is changed with respect to frequency characteristics of ghost removing filters at a frequency of at least 4.2 MHz depending on amounts of noises included in the image signal, and an equalizing characteristic of the image signal is changed with respect to the frequency characteristics of the ghost removing filters at a frequency of at most 4.2 MHz depending on the amounts of the noises.

18 Claims, 10 Drawing Sheets

GHOST REMOVAL APPARATUS

BACKGROUND OF THE INVENTION

The present invention relates to an apparatus for removing ghosts of television signals with a data processing for controlling filters.

Description of the Related Art

In a television (TV) receiver, a TV radio wave transmitted from a broadcasting station is converted into electric signals at a receiving antenna and is then converted into TV signals by a tuner. A TV radio wave reaches an antenna via a plurality of paths by some shielding or reflecting in addition to its direct arrival.

The radio wave repeatedly reflected has suffered a delay in time and a change in intensity compared with the radio wave directly reached. When reproducing on a TV screen, this reflected radio wave may often produce ghosts. A plurality of conventional ghost removal apparatuses have been developed, as disclosed in Japanese Patent Laid-Open Publication Nos. 56-69974, 3-117273, and 3-132166.

In such conventional ghost removal apparatuses, the ghosts are removed using a ghost removal reference signal shown in FIG. 1. In that case, a TV signal having much more noise, as shown in FIG. 2, is received, after the ghost removal, the frequency characteristic of the TV signal is shown in FIG. 3. A hatching 18 in FIG. 2 and a hatching 19 in FIG. 3 show noise included in the TV signal received. A hatching 20 in FIG. 3 shows noise emphasized by removing the ghosts.

In the conventional ghost removal apparatuses, when the ghosts are removed, the frequency characteristic of the TV signal is made to be an ideal characteristic. Accordingly, the high frequency area of the image signal is emphasized and the noise is thus emphasized in a receiving area having a weak electric field intensity. Further, with a transparent band of a cutoff frequency equal to or less than 4 MHz, a color ghost cannot be removed.

SUMMARY OF THE INVENTION

It is therefore an object of the present invention to provide a ghost removal apparatus in view of the aforementioned problems of the prior art, which is capable of removing ghosts in always the optimum state without emphasizing noise in a TV signal.

In accordance with one aspect of the present invention, there is provided a ghost removal apparatus, comprising a receiving circuit to receive a television radio wave signal transmitted from a television broadcast for converting the received television radio wave signal into an analog television signal of a base band to output the analog television signal as a first television signal; an analog-digital converter for converting the first television signal into a digital television signal as a second television signal; a waveform equalizing filter for removing a ghost generated by frequency characteristic attenuation and a small phase shift in the middle of propagation of the television radio wave signal from the second television signal to output a third television signal; a ghost reduction filter for removing a ghost generated by a time delay exceeding a predetermined range of the waveform equalizing filter from the third television signal to output a fourth television signal; a digital-analog converter for converting the fourth television signal as the digital signal into an analog television signal as a fifth television signal; and a control circuit for detecting a reference signal for removing ghosts from the fifth television signal and for controlling a weighting factor for a transversal filter, whereby noises included in an image signal is detected, controlling a transparent characteristic of the television signal by noise amounts.

In a ghost removal apparatus of the present invention, preferably, the waveform equalizing filter and the ghost reduction filter each include a delay circuit for delaying the input television signal for a predetermined time period, and a transversal filter for weighting the television signal output from the delay circuit every signal sampling by the analog-digital converter.

A ghost removal apparatus can further comprise a waveform capture memory for storing and outputting a predetermined image period of a ghost removal reference signal in the second television signal sent from the analog-digital converter, and a reference waveform memory for storing an ideal ghost removal reference signal, wherein the control circuit reads the ghost removal reference signal out of the waveform capture memory, compares the readout ghost removal reference signal with data of the ideal ghost removal reference signal read out of the reference waveform memory, calculates a first filter factor of the waveform equalizing filter and a second filter factor of the ghost reduction filter, and sets the first and second factors to the waveform equalizing filter and the ghost reduction filter, respectively.

In a ghost removal apparatus, preferably, the transparent characteristic is damped from 0 dB to $-\infty$ dB against a frequency of at least 4.2 MHz of the image signal.

Further, in a ghost removal apparatus, preferably, the frequency characteristic of the image signal is controlled to at most 0 dB against a frequency of at most 4.2 MHz of the image signal after the equalization.

Moreover, the transparent characteristic can be damped from 0 dB to $-\infty$ dB against a frequency of at least 4.2 MHz of the image signal, and the frequency characteristic of the image signal can be controlled to at most 0 dB against a frequency of at most 4.2 MHz of the image signal after the equalization.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
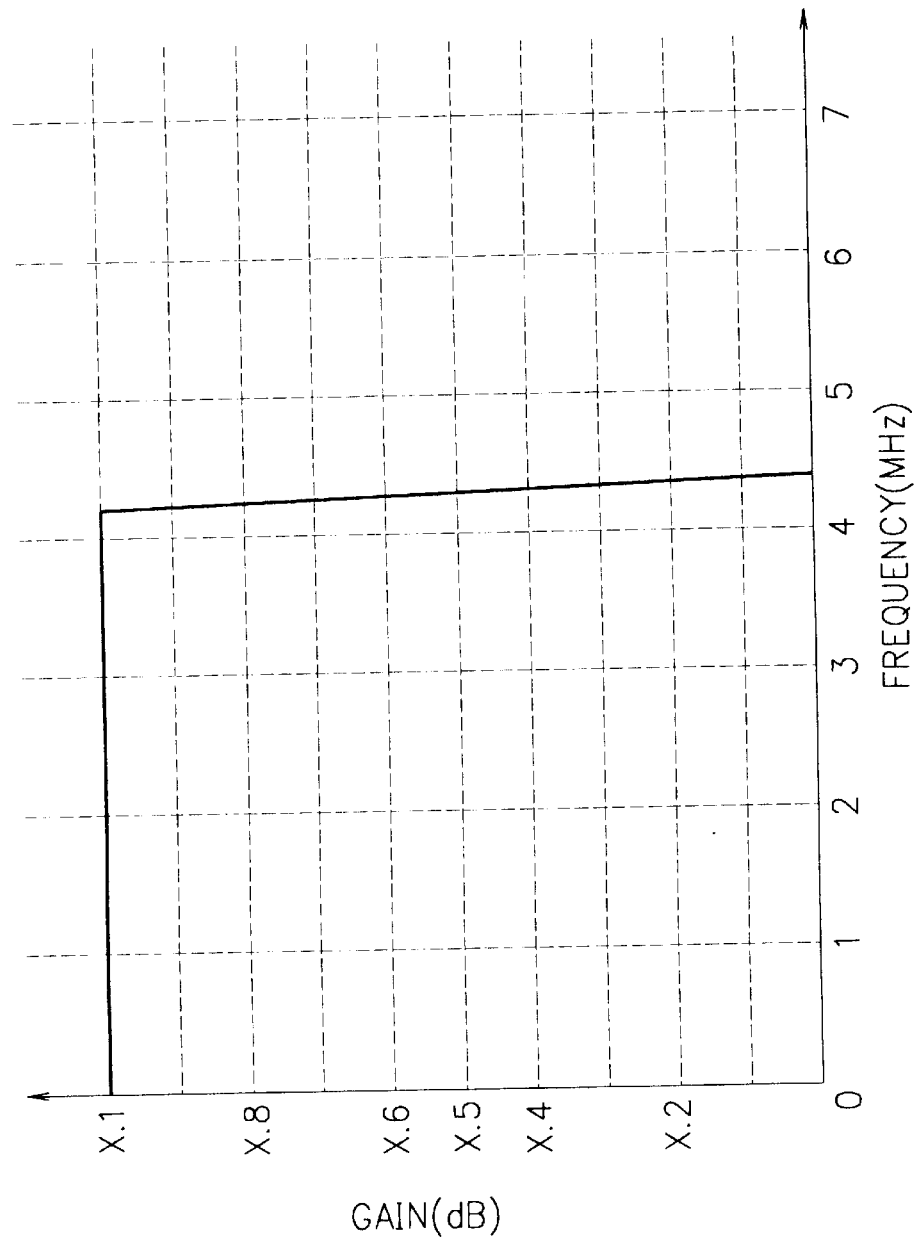
FIG. 1 is a graphical representation showing a frequency characteristic of an ideal ghost removal reference signal used in a conventional ghost removal apparatus.
Figure 2:
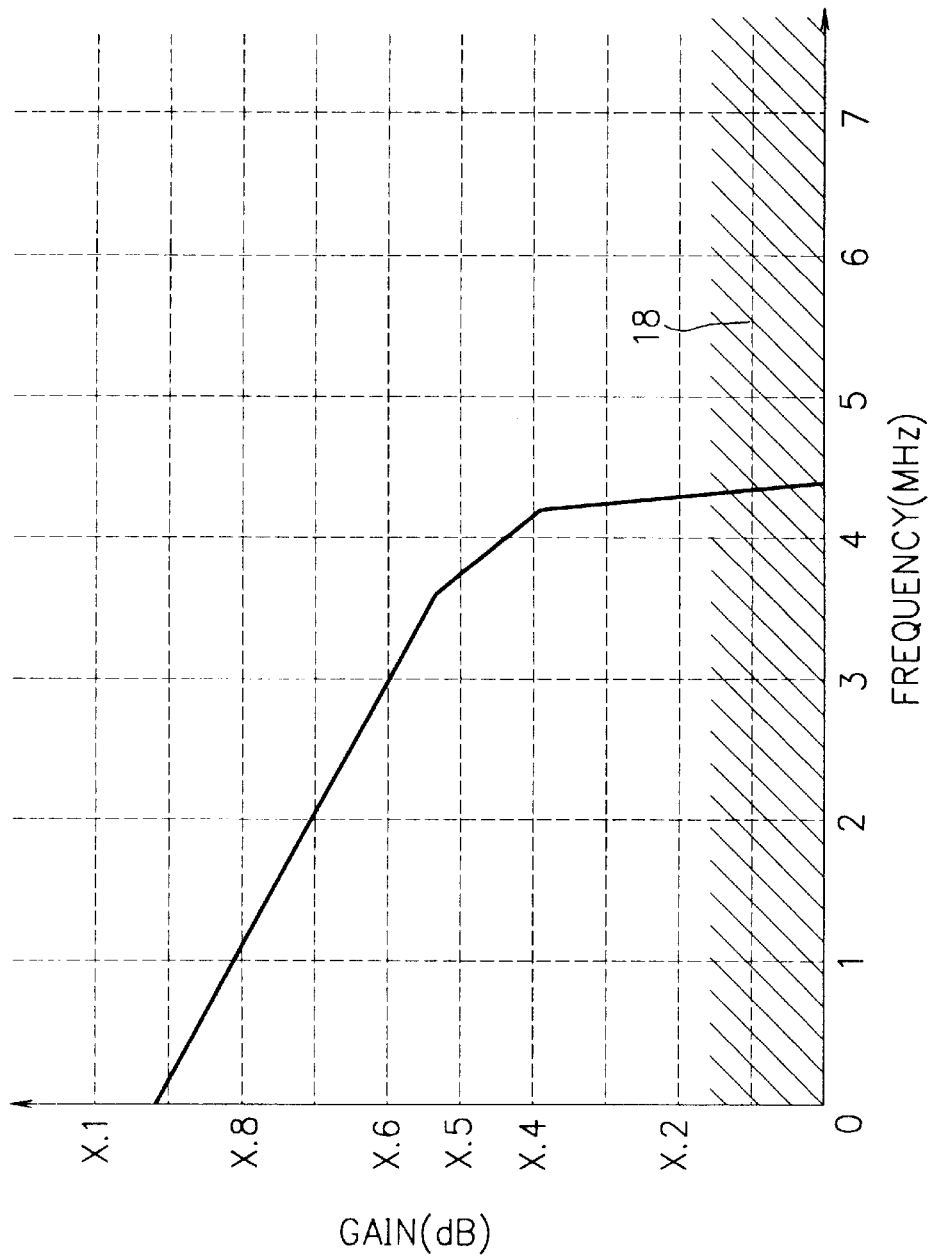
FIG. 2 is a graphical representation showing a frequency characteristic of a TV signal having a strong noise in a weak electric field in a conventional ghost removal apparatus.
Figure 3:
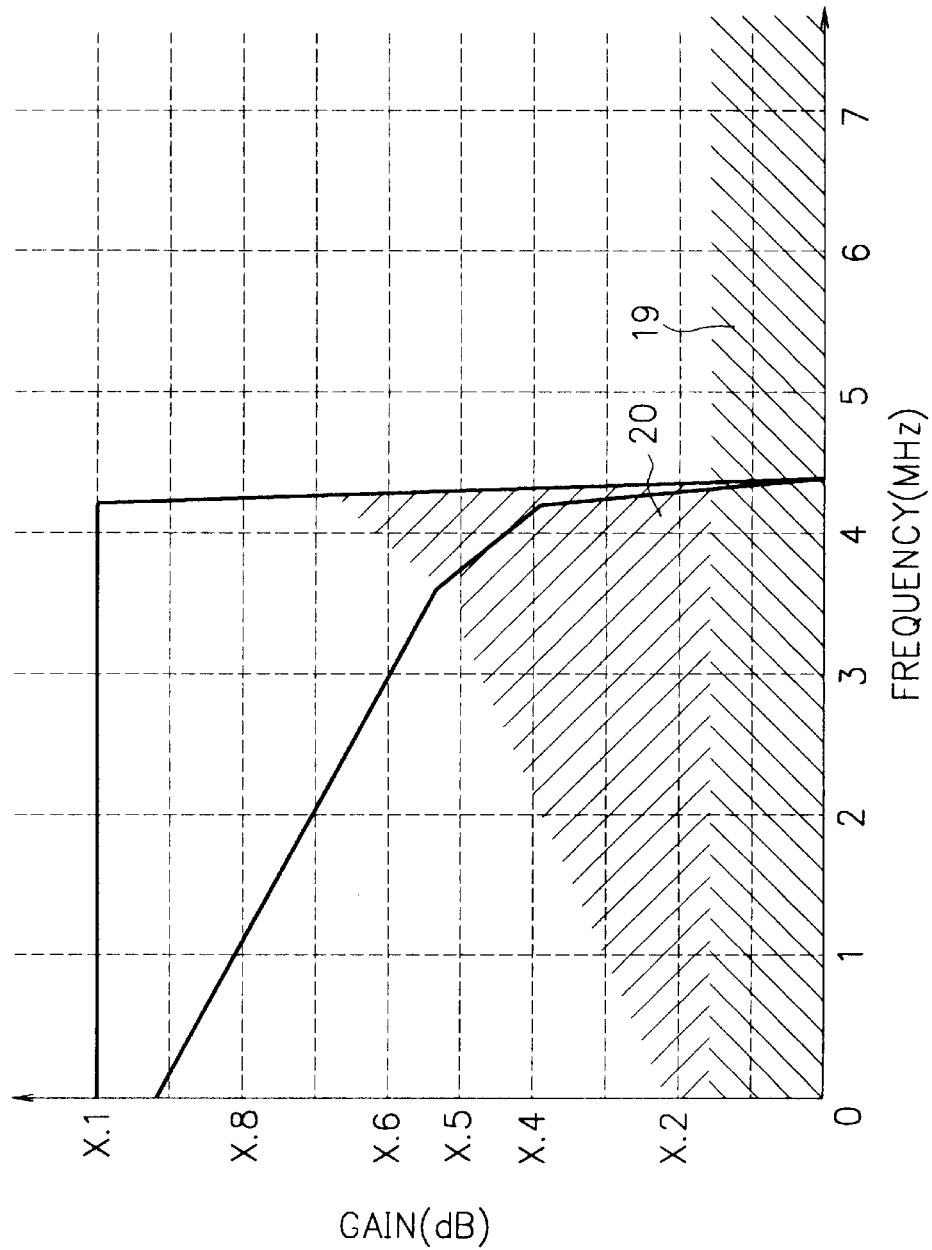
FIG. 3 is a graphical representation showing a frequency characteristic of the TV signal shown in FIG. 9, when the ghosts are removed in a conventional ghost removal apparatus.
Figure 4:
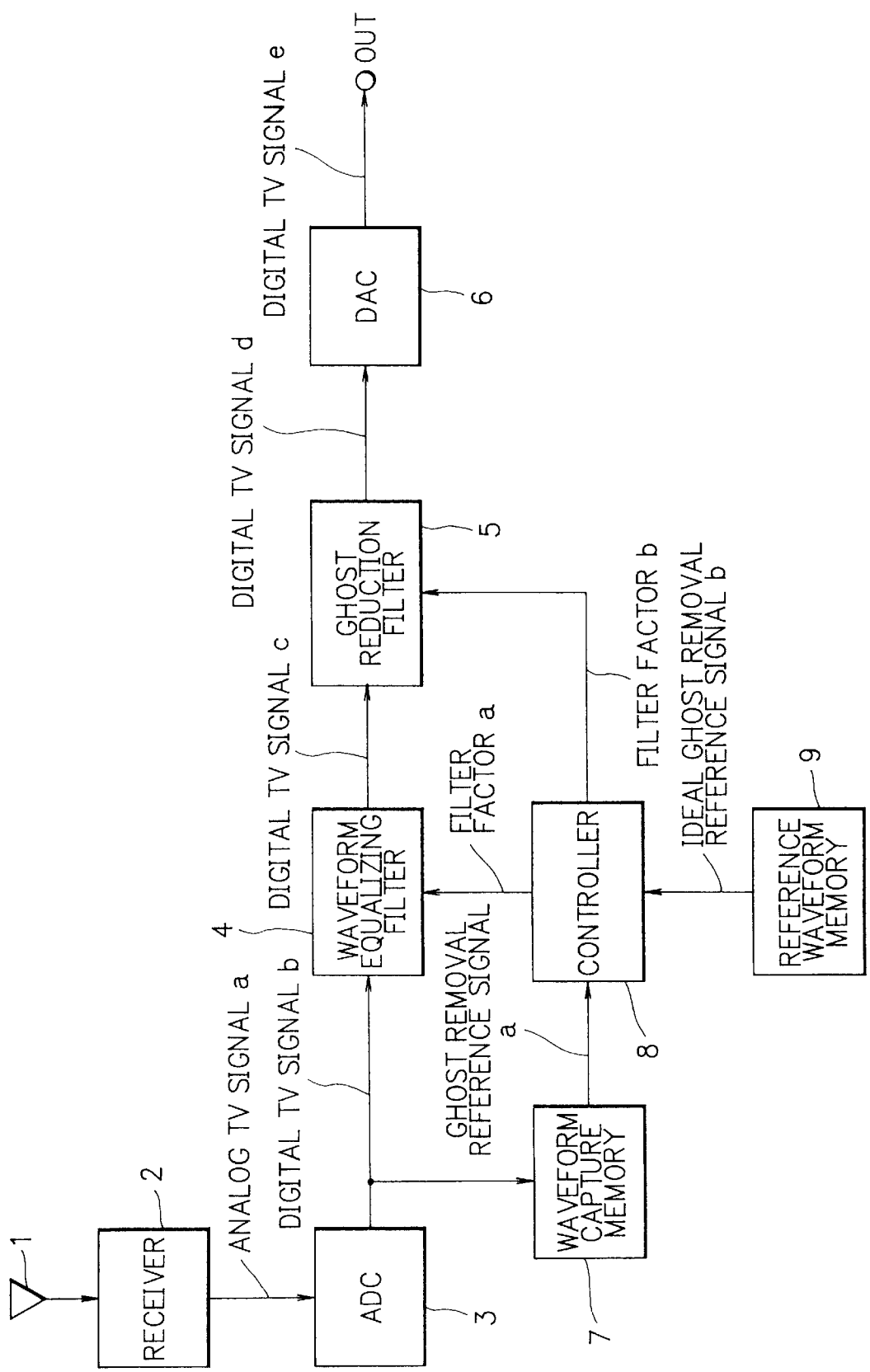
FIG. 4 is a block diagram of a ghost removal apparatus according to the present invention.

Referring now to the drawings, there is shown in FIG. 4 a ghost removal apparatus according to a first embodiment of the present invention.

In FIG. 4, an antenna 1 of a receiver circuit 2 receives a television (TV) broadcast, and the receiver circuit 2 outputs an analog TV signal a of a base band to an analog-digital converter (ADC) 3. The ADC 3 converts the analog TV signal a into a digital TV signal b and outputs the digital TV signal b to a waveform equalizing filter 4 and a waveform capture memory 7. The waveform equalizing filter 4 removes a ghost generated by frequency characteristic attenuation and a relatively small phase shift in the middle of propagation of the TV signal from the digital TV signal b to output a TV signal c to a ghost reduction filter 5. The ghost reduction filter 5 removes another ghost generated by a time delay exceeding a predetermined range of the waveform equalizing filter 4 from the TV signal c to output a ghost-free TV signal d to a digital-analog converter (DAC) 6. The DAC 6 converts the digital TV signal d into an analog TV signal e and outputs the same. The waveform capture memory stores and outputs a predetermined imaging period of a ghost removal reference signal a in the digital TV signal b. A controller 8 reads the ghost removal reference signal a out of the waveform capture memory 7, compares the ghost removal reference signal a with data of an ideal ghost removal reference signal b read out of a reference waveform memory 9 and calculates filter factors a and b for the waveform equalizing filter 4 and the ghost reduction filter 5. The filter factors a and b are set in the waveform equalizing filter 4 and the ghost reduction filter 5, respectively, so as to cancel the ghosts to obtain the ghost-free TV signal e.

The ghost removal reference signal a included in the image signal is read out of the waveform capture memory 7. The ghost removal reference signal a is then processed by 8 field sequence to negate a color burst signal and a horizontal synchronizing signal, preparing a no-signal part and detecting an intensity of the noise present in this no-signal part.

The controller 8 orthogonally transforms the captured ghost removal reference signal a by a Fourier transformation (FFT) to obtain data and divides the frequency characteristic data of the ideal ghost removal reference signal b read out of the reference waveform memory 9 by the foregoing data. This division result is processed with the above-described noise intensity to change the cutoff frequency and thus to change the transparent (pass) band of the image signal. This result is processed by an inverse Fourier transformation (IFFT) to determine the waveform equalizing filter factor. The controller 8 further executes a Fourier transformation of the waveform equalizing filter factor and the data of waveform capture memory and multiplies the results to calculate the frequency characteristic of the image signal after the waveform equalization and the situation of the ghosts. From this result and the waveform of the ideal ghost removal reference signal to be output, the characteristic of the ghost reduction filter is calculated. This result is processed with the aforementioned noise intensity to change the cutoff frequency and thus to change the transparent band. This result is processed by an inverse Fourier transformation to determine the ghost reduction filter factor.

That is, the controller 8 reads the ghost removal reference signal a out of the waveform capture memory 7 and compares the readout data with the data of the ideal ghost removal reference signal b ("Rb(jω)" hereinafter) to calculate the filter factor a ("ha(t)" hereinafter) of the waveform equalizing filter 4 and the filter factor b ("hb(t)" hereinafter) of the ghost reduction filter 5. The filter factors ha(t) and hb(t) are set to the waveform equalizing filter 4 and the ghost reduction filter 5, respectively, to negate the ghosts, resulting in outputting the ghost-free TV signal e.

Figure 5:
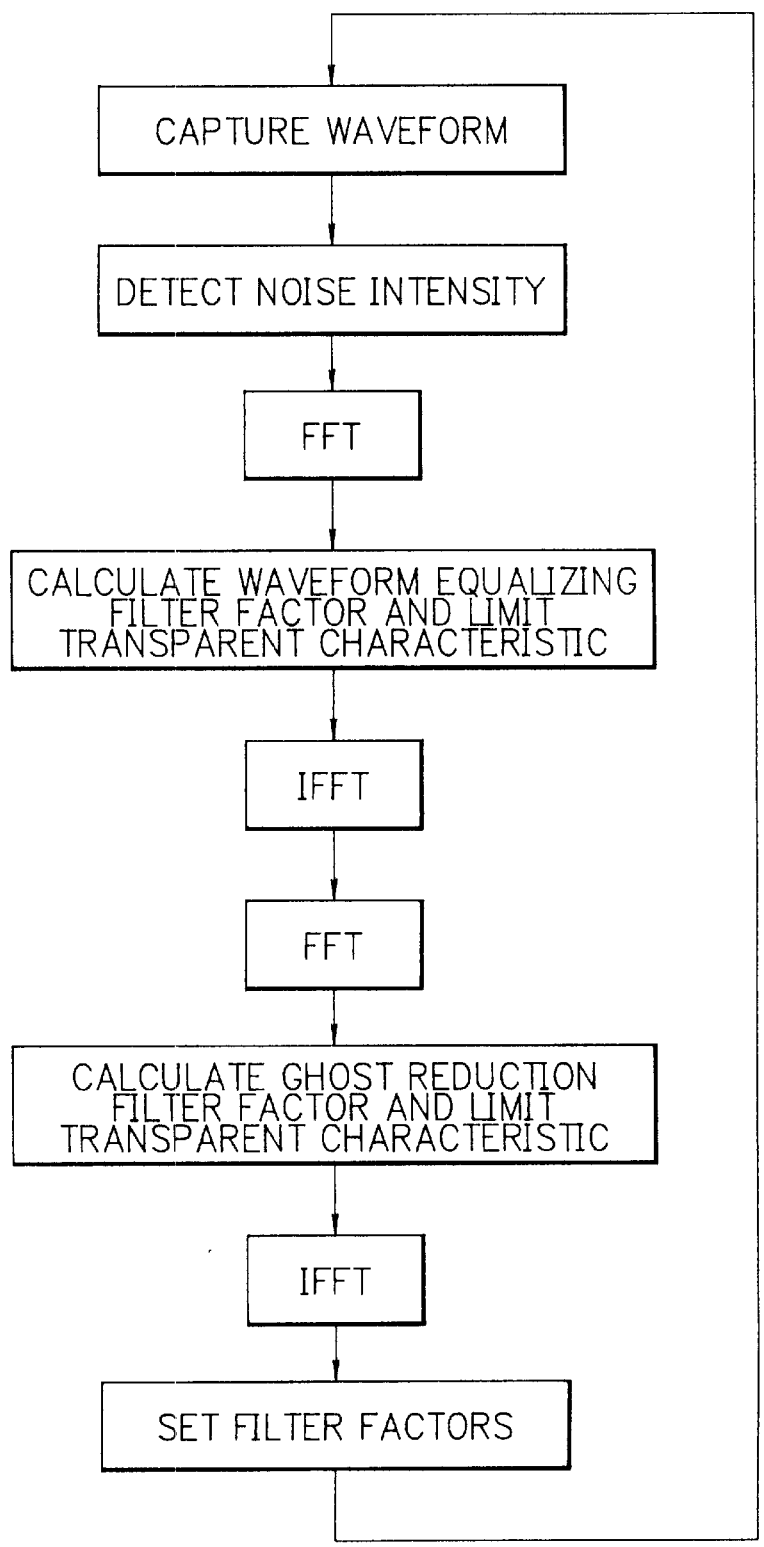
FIG. 5 is a flow chart showing a control method according to a first embodiment of the present invention.

FIG. 5 shows a control flow of the controller 8 according to the first embodiment of the present invention.

The waveform capture memory 7 selects and stores the ghost removal reference signal a included in the image signal b. The controller 8 reads the ghost removal reference signal a out of the waveform capture memory 7, and executes the 8 field sequence of the readout ghost removal reference signal a to negate the color burst signal and the horizontal synchronizing signal to determine the ghost-removed reference signal c ("gc(t)" hereinafter). The controller 8 then detects the noise intensity a in the no-signal part of the signal gc(t).

The controller 8 carries out the orthogonal transformation of the signal gc(t) by the Fourier transformation to obtain the ghost-removed reference signal d ("Gd(jω)" hereinafter) as follows.

$$Gd(j\omega) = \int gc(t) e^{j\omega t} dt \qquad (1)$$

The signal Rb(jω) is divided by Gd(jω) to obtain a filter factor c ("Hc(jω)" hereinafter) of the waveform equalizing filter 4 as follows.

$$Hc(j\omega) = Rb(j\omega)/Gd(j\omega) \qquad (2)$$

The transparent characteristic (i.e., pass characteristic) of the filter factor Hc(jω) is restricted by the noise intensity a calculated from the ghost removal reference signal c to produce a filter factor d ("Hd(jω)" hereinafter).

Figure 6:
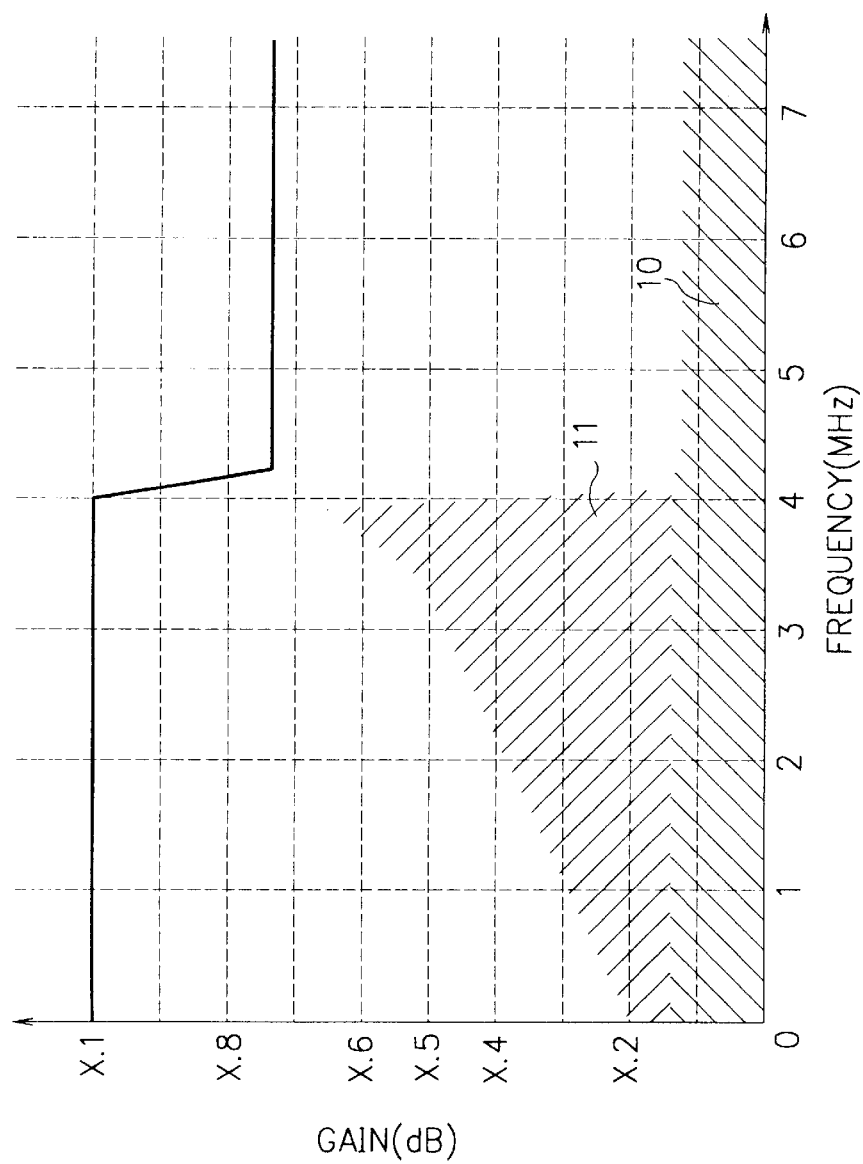
FIG. 6 is a graphical representation showing a frequency characteristic of a TV signal when ghosts are removed according to the first embodiment of the present invention.
Figure 7:
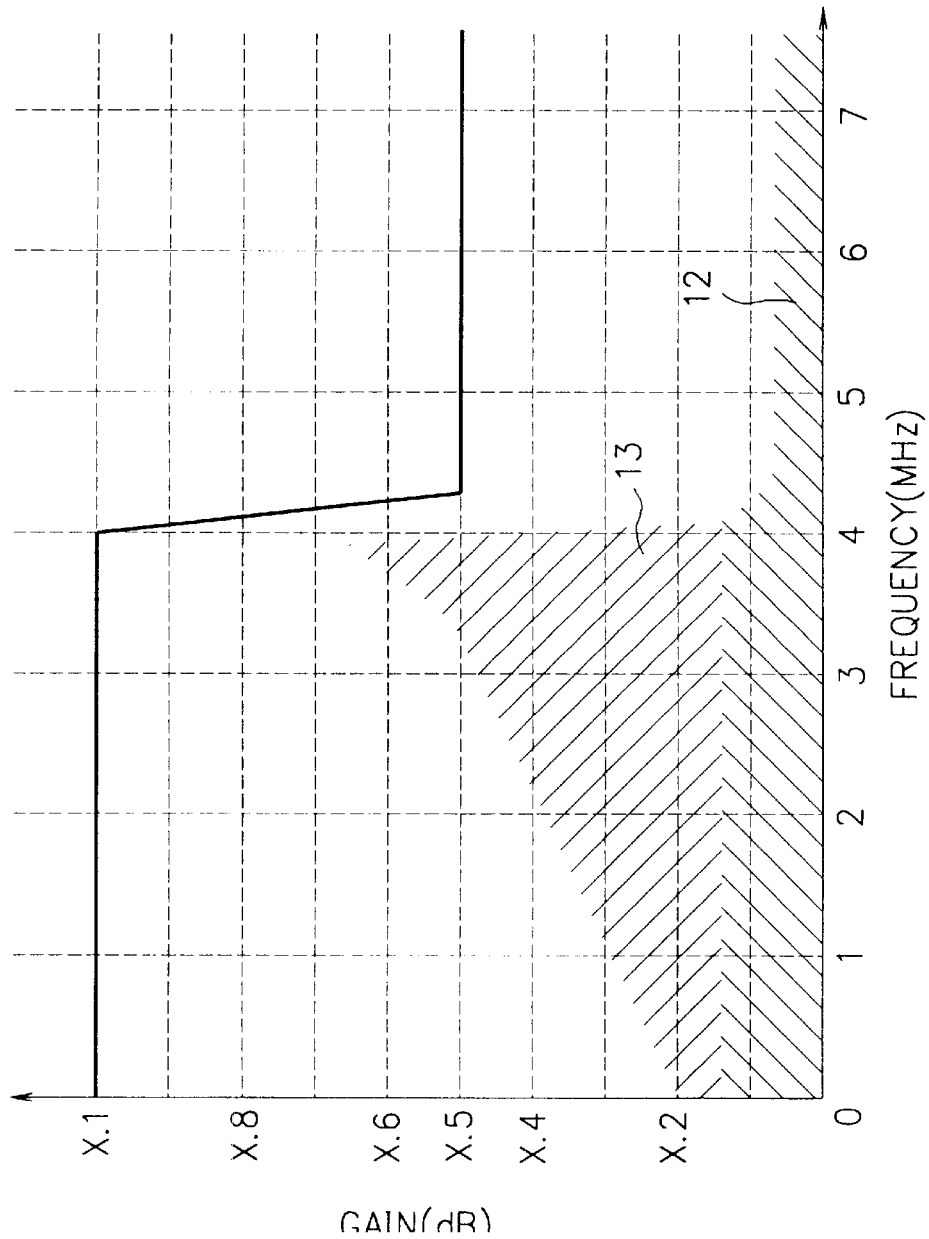
FIG. 7 is a graphical representation showing another frequency characteristic of the TV signal when ghosts are removed according to the first embodiment of the present invention.
Figure 8:
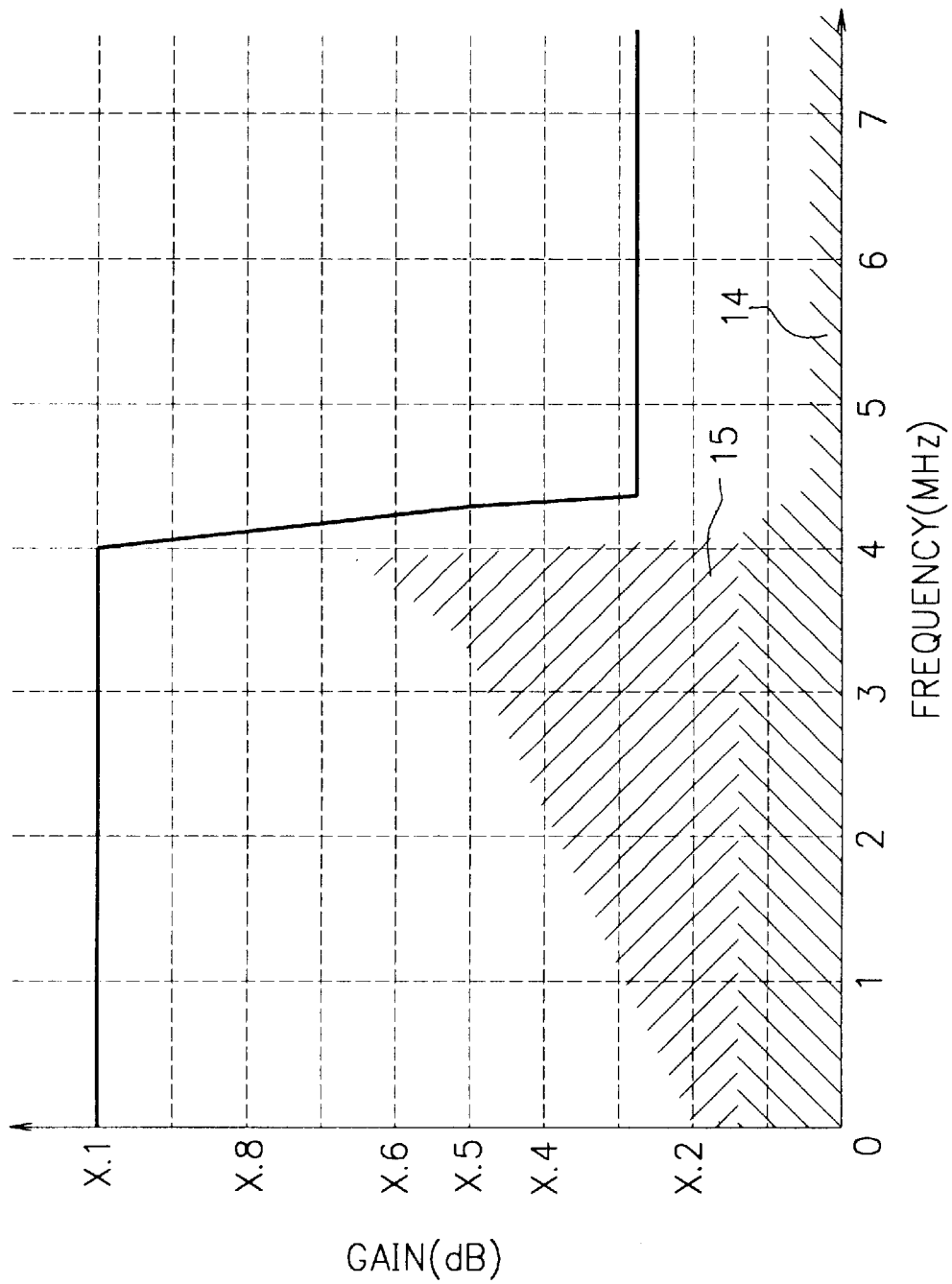
FIG. 8 is a graphical representation showing a further frequency characteristic of the TV signal when ghosts are removed according to the first embodiment of the present invention.

The limitation of the transparent characteristic is shown in FIG. 6, FIG. 7 and FIG. 8. In FIGS. 6 to 8, hatchings 10, 12 and 14 show noise included in the original TV signal, and hatchings 11, 13 and 15 show noise emphasized by removing the ghosts. Up to 4 MHz, one time filter factor Hc(jω) is used. At the frequency band of at least 4.2 MHz, the transparent characteristic is used at a fixed value such as 1, ¾, ½, ¼ or 0. The magnification is gradually changed from 4 Hz to 4.2 MHz.

When ω/2π <4 MHz, the filter factor Hd(jω) turns out as follows.

$$Hd(j\omega) = Hc(j\omega) \qquad (3)$$

When ω/2π≧4 MHz and the noise intensity a is very small, the filter factor Hd(jω) is obtained as follows.

$$Hd(j\omega) = 1 \qquad (4)$$

When ω/2π≧4 MHz and the noise intensity a is small, the filter factor Hd(jω) is as follows.

$$Hd(j\omega) = ¾ \qquad (5)$$

When ω/2π≧4 MHz and the noise intensity a is slightly small, the filter factor Hd(jω) is as follows.

$$Hd(j\omega)=\tfrac{1}{2} \quad (6)$$

When $\omega/2\pi \geq 4$ MHz and the noise intensity a is large, the filter factor $Hd(j\omega)$ is as follows.

$$Hd(j\omega)=\tfrac{1}{4} \quad (7)$$

When $\omega/2\pi \geq 4$ MHz and the noise intensity a is very large, the filter factor $Hd(j\omega)$ is as follows.

$$Hd(j\omega)=0 \quad (8)$$

When the filter factor $Hd(j\omega)$ undergoes the inverse Fourier transformation, the filter factor ha(t) is calculated as follows.

$$ha(t)=\int Hd(j\omega)e^{jwt}d\omega \quad (9)$$

The controller 8 implements the Fourier transformation of ha(t) and gc(t) and multiplies the results to calculate a frequency characteristic ("Ge(j$\omega$)" hereinafter) of the TV signal c output from the waveform equalizing filter 4 as follows.

$$Ge(j\omega))=\int gc(t)e^{jwt}dt \quad (10)$$

From Ge(j$\omega$) and Rb(j$\omega$). a filter factor e ("He(j$\omega$)" hereinafter) for the ghost reduction filter 5 is calculated as follows.

$$He(j\omega)=(1-Ge(j\omega))/Rb(j\omega)) \quad (11)$$

The transparent characteristic of He(j$\omega$) is limited by the noise intensity a to produce a filter factor f ("Hf (j$\omega$)" hereinafter).

The limitation of the transparent characteristic is shown in FIG. 6, FIG. 7 and FIG. 8. In FIGS. 6 to 8, the hatchings 10, 12 and 14 show the noise included in the original TV signal, and the hatchings 11, 13 and 15 show the noises emphasized by removing the ghosts. Up to 4 MHz, one time filter factor He(j$\omega$) is used. At the frequency band of at least 4.2 MHz, the transparent characteristic is used at a fixed value such as 1, ¾, ½, ¼ or 0. The magnification is gradually changed from 4 MHz to 4.2 MHz.

When $\omega/2\pi < 4$ MHz, the filter factor Hf(j$\omega$)) is expressed as follows.

$$Hf(j\omega)=He(j\omega) \quad (12)$$

When $\omega/2\pi \geq 4$ MHz and the noise intensity a is very small, the filter factor Hf(j$\omega$) is obtained as follows.

$$Hf(j\omega)=1 \quad (13)$$

When $\omega/2\pi \geq 4$ MHz and the noise intensity a is small, the filter factor Hf(j$\omega$) is as follows.

$$Hf(j\omega)=\tfrac{3}{4} \quad (14)$$

When $\omega/2\pi \geq 4$ MHz and the noise intensity a is slightly small, the filter factor Hf(j$\omega$) is as follows.

$$Hf(j\omega)=\tfrac{1}{2} \quad (15)$$

When $\omega/2\pi \geq 4$ MHz and the noise intensity a is large, the filter factor Hf(j$\omega$) is as follows.

$$Hf(j\omega)=\tfrac{1}{4} \quad (16)$$

When $\omega/2\pi \geq 4$ MHz and the noise intensity a is very large, the filter factor Hf(j$\omega$) is as follows.

$$Hf(j\omega)=0 \quad (17)$$

When the filter factor Hf(j$\omega$) undergoes the inverse Fourier transformation, the filter factor hb(t) is calculated as follows.

$$hb(t)=\int Hf(j\omega)e^{jwt}d\omega \quad (18)$$

Figure 9:
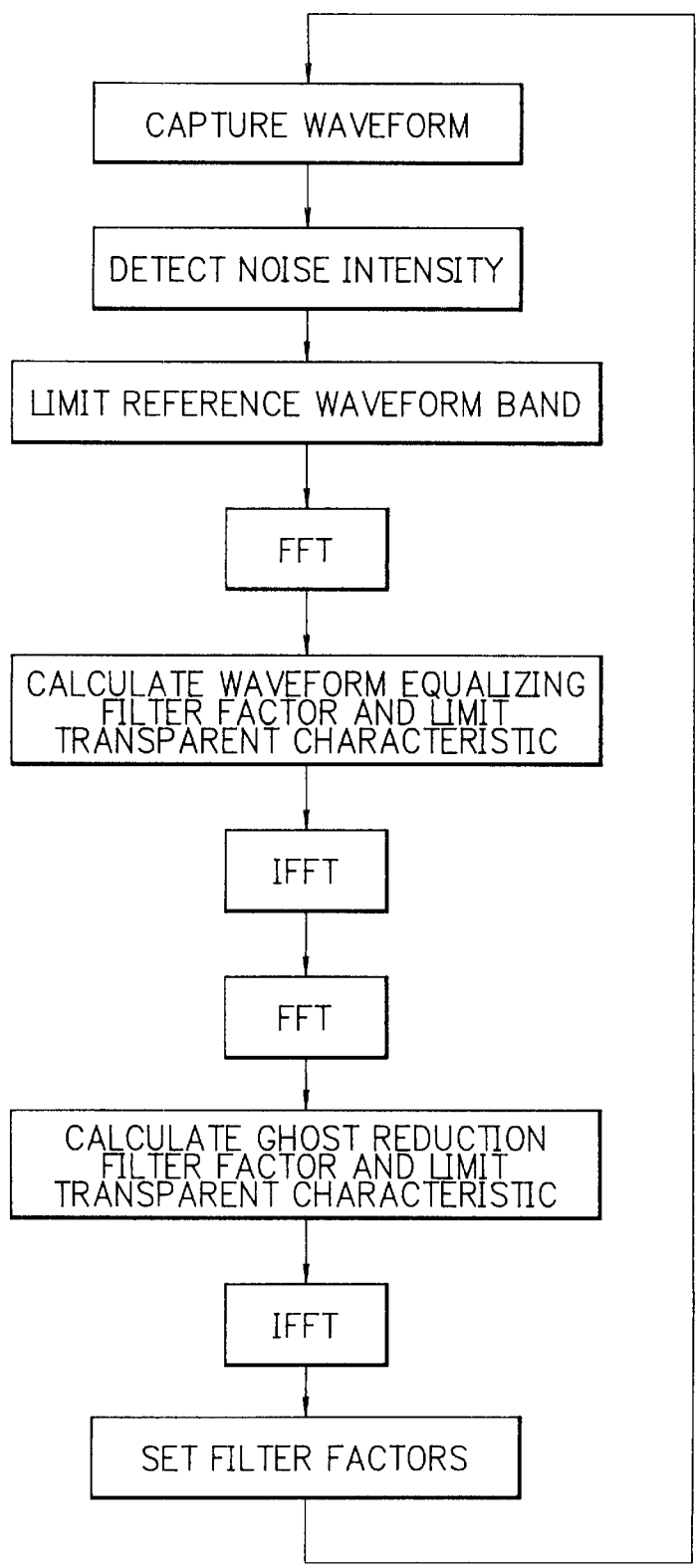
FIG. 9 is a flow chart showing a control method according to a second embodiment of the present invention.

Next, a ghost removal apparatus according to a second embodiment of the present invention will be described. In this embodiment, the construction of the ghost removal apparatus is the same as that of the first embodiment, as shown in FIG. 4. FIG. 9 shows a control flow of a controller 8 according to the second embodiment of the present invention.

The waveform capture memory 7 selects and stores the ghost removal reference signal a included in the image signal b. The controller 8 reads the ghost removal reference signal a out of the waveform capture memory 7, and executes the 8 field sequence of the readout ghost removal reference signal a to negate the color burst signal and the horizontal synchronizing signal to produce a ghost-removed reference signal gc(t). The controller 8 then detects the noise intensity a in a no-signal part of the signal gc(t).

The controller 8 reads the ideal ghost removal reference signal Rb(j$\omega$) out of the reference waveform memory 9 and sets magnifications by the noise intensity, that is, one time of 0 MHz, and 1, ⅞, ⅞, ⅝ and ⅛ times of 4 MHz. The magnifications from 0 MHz to 4 MHz are determined at a fixed inclination. This magnification is multiplied to the ghost removal reference signal b to produce a ghost removal reference signal e ("Re(j$\omega$)" hereinafter).

When $\omega=0$, the ghost removal reference signal Re(j$\omega$) is expressed as follows.

$$Re(j\omega)=1 \times Rb(j\omega) \quad (19)$$

When $\omega/2\pi \geq 4$ MHz and the noise intensity a is very small, the ghost removal reference signal Re(j$\omega$) is obtained as follows.

$$Re(j\omega)=1 \times Rb(j\omega) \quad (20)$$

When $\omega/2\pi \geq 4$ MHz and the noise intensity a is small, the ghost removal reference signal Re(j$\omega$) is as follows.

$$Re(j\omega)=\tfrac{7}{8} \times Rb(j\omega) \quad (21)$$

When $\omega/2\pi \geq 4$ MHz and the noise intensity a is slightly small, the ghost removal reference signal Re(j$\omega$) isas follows.

$$Re(j\omega)=\tfrac{6}{8} \times Rb(j\omega) \quad (22)$$

When $\omega/2\pi \geq 4$ MHz and the noise intensity a is large, the ghost removal reference signal Re(j$\omega$) is as follows.

$$Re(j\omega)=\tfrac{5}{8} \times Rb(j\omega) \quad (23)$$

When $\omega/2\pi \geq 4$ MHz and the noise intensity a is very large, the ghost removal reference signal Re(j$\omega$) is as follows.

$$Re(j\omega)=\tfrac{4}{8} \times Rb(j\omega) \quad (24)$$

The controller 8 executes an orthogonal transformation of gc(j$\omega$) by a Fourier transformation and the result is considered as a signal Gd(j$\omega$) as follows.

$$Gd(j\omega)=\int gc(t)e^{jwt}dt \quad (25)$$

The signal Gd(j$\omega$) is divided by Re(j$\omega$) to obtain a filter factor g ("Hg(j$\omega$)" hereinafter) of the waveform equalizing filter 4 as follows.

$$Hg(j\omega)=Re(j\omega)/Gd(j\omega) \qquad (26)$$

The transparent characteristic of the filter factor Hg(jω) is restricted by the noise intensity a to produce a filter factor h ("Hh(jω)" hereinafter).

Figure 10:
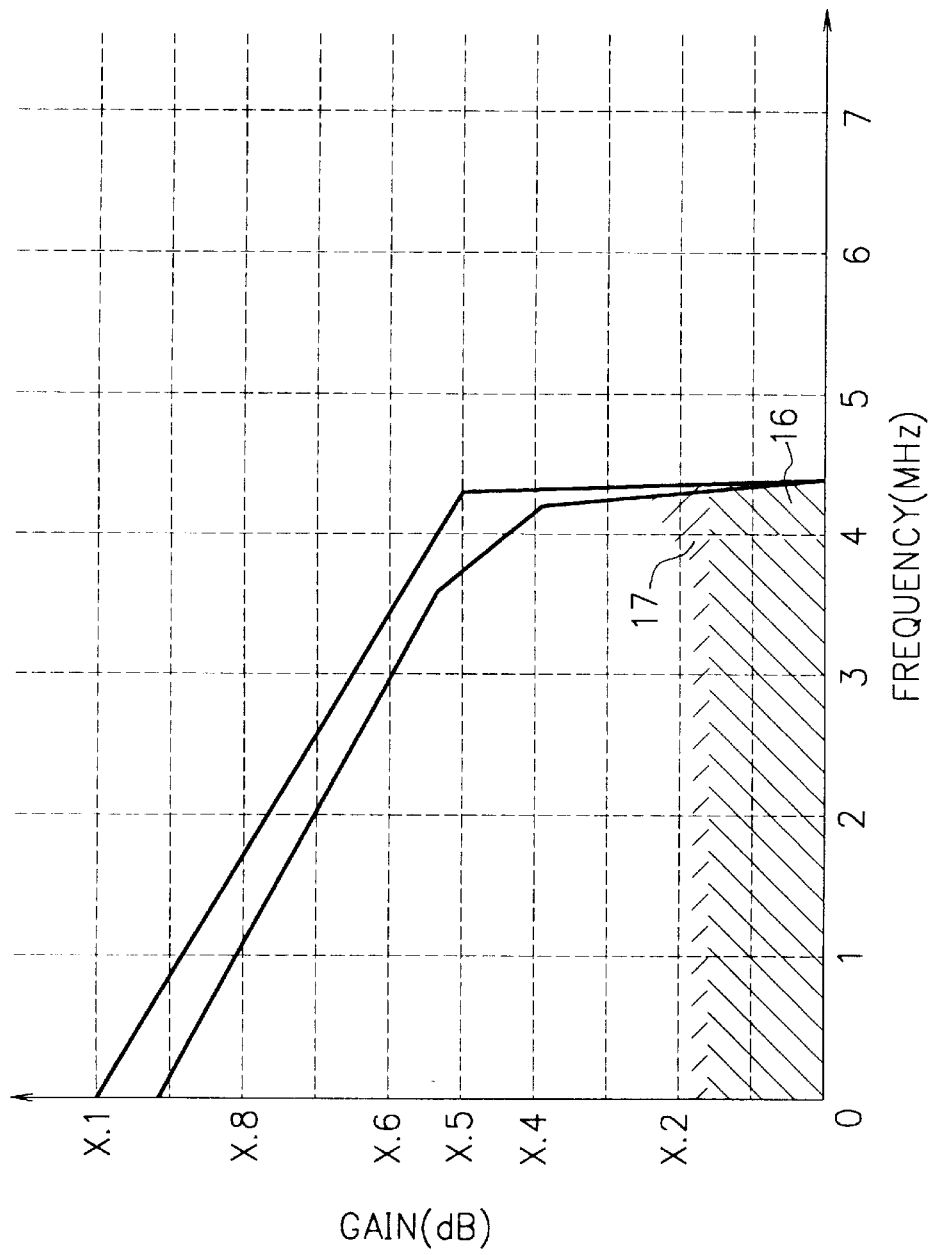
FIG. 10 is a graphical representation showing a frequency characteristic of a TV signal when ghosts are removed according to the second embodiment of the present invention.

The limitation of the transparent characteristic is shown in FIG. 10. In FIG. 10, a hatching 16 shows a noise included in the original TV signal, and a hatching 17 shows a noise included in the TV signal of a weak electric field. Up to 4 MHz, one time filter factor Hc(jω) is used. At the frequency band of at least 4.2 MHz, the transparent characteristic is used at a fixed value such as 1, ¾, ½, ¼ or 0. The magnification is gradually changed from 4 MHz to 4.2 MHz.

When ω/2π<4 MHz, the filter factor Hh(jω) is shown as follows.

$$Hd(j\omega)=Hg(j\omega) \qquad (27)$$

When ω/2π≧4 MHz and the noise intensity a is very small, the filter factor Hh(jω) is obtained as follows.

$$Hh(j\omega)=1 \qquad (28)$$

When ω/2π≧4 MHz and the noise intensity a is small, the filter factor Hh(jω) is as follows.

$$Hh(j\omega)=¾ \qquad (29)$$

When ω/2π≧4 MHz and the noise intensity a is slightly small, the filter factor Hh(jω) is as follows.

$$Hh(j\omega)=½ \qquad (30)$$

When ω/2π≧4 MHz and the noise intensity a is large, the filter factor Hh(jω) is as follows.

$$Hh(j\omega)=¼ \qquad (31)$$

When ω/2π≧4 MHz and the noise intensity a is very large, the filter factor Hh(jω) is as follows.

$$Hh(j\omega)=0 \qquad (32)$$

When the filter factor Hh(jωi) undergoes an inverse Fourier transformation, the filter factor ha(t) is calculated as follows.

$$ha(t)=\int Hh(j\omega)e^{iwt}d\omega \qquad (33)$$

The controller 8 implements the Fourier transformation of ha(t) and gc(t) and multiplies the results to calculate a frequency characteristic Ge(jω) output from the waveform equalizing filter 4 as follows.

$$Ge(j\omega)=\int gc(t)e^{iwt}dt \times \int ha(t)e^{iwt}dt \qquad (34)$$

From Ge(jω) and Re(jω), a filter factor i ("Hi(jω)" hereinafter) for the ghost reduction filter 5 is calculated as follows.

$$Hi(j\omega)=(1-Ge(j\omega))/Re(j\omega) \qquad (35)$$

The transparent characteristic of Hi(jω) is limited by the noise intensity a to produce a filter factor i ("Hj(jω)" hereinafter).

The limitation of the transparent characteristic is shown in FIG. 10. Up to 4 MHz, one time filter factor Hi(jω) is used. At the frequency band of at least 4.2 MHz, the transparent characteristic is used at a fixed value such as 1, ¾, ½, ¼ or 0. The magnification is gradually changed from 4 MHz to 4.2 MHz.

When ω/2π<4 MHz, the filter factor Hj(jω) is shown as follows.

$$Hj(j\omega)=Hi(j\omega) \qquad (36)$$

When ω/2π≧4 MHz and the noise intensity a is very small, the filter factor Hj(jω) is obtained as follows.

$$Hj(j\omega)=1 \qquad (37)$$

When ω/2π≧4 MHz and the noise intensity a is small, the filter factor Hj(jω) is as follows.

$$Hj(j\omega)=¾ \qquad (38)$$

When ω/2π≧4 MHz and the noise intensity a is slightly small, the filter factor Hj(jω) is as follows.

$$Hj(j\omega)=½ \qquad (39)$$

When ω/2π≧4 MHz and the noise intensity a is large, the filter factor Hj(jω) is as follows.

$$Hj(j\omega)=¼ \qquad (40)$$

When ω/2π≧4 MHz and the noise intensity a is very large, the filter factor Hj(jω) is as follows.

$$Hj(j\omega)=0 \qquad (41)$$

When the filter factor Hj(jω) undergoes an inverse Fourier transformation, the filter factor hb(t) is calculated as follows.

$$hb(t)=\int Hj(j\omega)e^{iwt}d\omega \qquad (42)$$

As described above, according to the present invention, even in a receiving area having a weak intensity of a radio wave of a TV broadcast, a noise intensity in a TV signal can be detected to control a ghost reduction reference level. As a result, ghosts can be effectively removed in always the optimum state without emphasizing noise in the TV signal.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A ghost removal apparatus, comprising:

a receiving circuit to receive a television radio wave signal transmitted from a television broadcast for converting the received television radio wave signal into an analog television signal of a base band to output the analog television signal as a first television signal;

an analog-digital converter for converting the first television signal into a digital television signal as a second television signal;

a waveform equalizing filter for removing a ghost generated by a frequency characteristic attenuation and a small phase shift in a middle of propagation of the television radio wave signal from the second television signal to output a third television signal;

a ghost reduction filter for removing a ghost generated by a time delay exceeding a predetermined range of the waveform equalizing filter from the third television signal to output a fourth television signal;

a digital-analog converter for converting the fourth television signal as the digital signal into an analog television signal as a fifth television signal; and a control circuit for detecting a reference signal for removing ghosts from the second and third television signals and for controlling a weighting factor for at least one of the waveform equalizing filter and the ghost reduction filter, wherein noise included in an image signal is detected, and a pass characteristic of at least one of the waveform equalizing filter and the ghost reduction filter is controlled based on an amplitude of the detected noise.

2. A ghost removal apparatus of claim 1, wherein the waveform equalizing filter and the ghost reduction filter each include a delay circuit for delaying the input television signal for a predetermined time period, and a transversal filter for weighting the television signal output from the delay circuit every signal sampling by the analog-digital converter.

3. A ghost removal apparatus of claim 1, further comprising a waveform capture memory for storing and outputting a predetermined image period of a ghost removal reference signal in the second television signal sent from the analog-digital converter, and a reference waveform memory for storing an ideal ghost removal reference signal, wherein the control circuit reads the ghost removal reference signal out of the waveform capture memory, compares the readout ghost removal reference signal with data of the ideal ghost removal reference signal read out of the reference waveform memory, calculates a first filter factor of the waveform equalizing filter and a second filter factor of the ghost reduction filter, and sets the first and second factors to the waveform equalizing filter and the ghost reduction filter, respectively.

4. A ghost removal apparatus of claim 2, further comprising a waveform capture memory for storing and outputting a predetermined image period of a ghost removal reference signal in the second television signal sent from the analog-digital converter, and a reference waveform memory for storing an ideal ghost removal reference signal, wherein the control circuit reads the ghost removal reference signal out of the waveform capture memory, compares the readout ghost removal reference signal with data of the ideal ghost removal reference signal read-out of the reference waveform memory, calculates a first filter factor of the waveform equalizing filter and a second filter factor of the ghost reduction filter, and sets the first and second factors to the waveform equalizing filter and the ghost reduction filter, respectively.

5. A ghost removal apparatus of claim 1, wherein the pass characteristic is damped from 0 dB to $-\infty$ dB against a frequency of at least 4.2 MHz of the image signal.

6. A ghost removal apparatus of claim 2, wherein the pass characteristic is damped from 0 dB to $-\infty$ dB against a frequency of at least 4.2 MHz of the image signal.

7. A ghost removal apparatus of claim 3, wherein the pass characteristic is damped from 0 dB to $-\infty$ dB against a frequency of at least 4.2 MHz of the image signal.

8. A ghost removal apparatus of claim 4, wherein the pass characteristic is damped from 0 dB to $-\infty$ dB against a frequency of at least 4.2 MHz of the image signal.

9. A ghost removal apparatus of claim 1, wherein the frequency characteristic of the image signal is controlled to at most 0 dB against a frequency of at most 4.2 MHz of the image signal after the equalization.

10. A ghost removal apparatus of claim 2, wherein the frequency characteristic of the image signal is controlled to at most 0 dB against a frequency of at most 4.2 MHz of the image signal after the equalization.

11. A ghost removal apparatus of claim 3, wherein the frequency characteristic of the image signal is controlled to at most 0 dB against a frequency of at most 4.2 MHz of the image signal after the equalization.

12. A ghost removal apparatus of claim 4, wherein the frequency characteristic of the image signal is controlled to at most 0 dB against a frequency of at most 4.2 MHz of the image signal after the equalization.

13. A ghost removal apparatus of claim 1, wherein the pass characteristic is damped from 0 dB to $-\infty$ dB against a frequency of at least 4.2 MHz of the image signal, and the frequency characteristic of the image signal is controlled to at most 0 dB against a frequency of at most 4.2 MHz of the image signal after the equalization.

14. A ghost removal apparatus of claim 2, wherein the pass characteristic is damped from 0 dB to $-\infty$ dB against a frequency of at least 4.2 MHz of the image signal, and the frequency characteristic of the image signal is controlled to at most 0 dB against a frequency of at most 4.2 MHz of the image signal after the equalization.

15. A ghost removal apparatus of claim 3, wherein the pass characteristic is damped from 0 dB to $-\infty$ dB against a frequency of at least 4.2 MHz of the image signal, and the frequency characteristic of the image signal is controlled to at most 0 dB against a frequency of at most 4.2 MHz of the image signal after the equalization.

16. A ghost removal apparatus of claim 4, wherein the pass characteristic is damped from 0 dB to $-\infty$ to dB against a frequency of at least 4.2 MHz of the image signal, and the frequency characteristic of the image signal is controlled to at most 0 dB against a frequency of at most 4.2 MHz of the image signal after the equalization.

17. A ghost removal apparatus, comprising:

a receiving circuit that receives a television radio wave signal transmitted from a television broadcast and converts the received television radio wave signal into an analog television signal of a base band to output the analog television signal as a first television signal;

an analog-digital converter that converts the first television signal into a digital television signal as a second television signal;

a waveform equalizing filter that removes a ghost generated by a frequency characteristic attenuation and a relatively small phase shift in a middle of the propagation of the television radio wave signal from the second television signal to output a third television signal;

a ghost reduction filter that removes a ghost generated by a time delay exceeding a predetermined range of the waveform equalizing filter from the third television signal to output a fourth television signal;

a digital-analog converter that converts the fourth television signal into an analog television signal as a fifth television signal; and a control circuit that detects a reference signal in the second television signal for removing ghosts from the second and third television signals, detects an amplitude of noise in the reference signal, and controls a weighting factor for a filter factor for at least one of the waveform equalizing filter and the ghost reduction filter, wherein the weighting factor for the filter factor is based on the amplitude of noise detected in the reference signal.

18. A ghost removal apparatus, comprising:

a receiving circuit that receives a television radio wave signal transmitted from a television broadcast and converts the received television radio wave signal into an analog television signal of a base band to output the analog television signal as a first television signal;

an analog-digital converter that converts the first television signal into a digital television signal as a second television signal;

a waveform equalizing filter that removes a ghost generated by a frequency characteristic attenuation and a relatively small phase shift in a middle of the propagation of the television radio wave signal from the second television signal to output a third television signal;

a ghost reduction filter that removes a ghost generated by a time delay exceeding a predetermined range of the waveform equalizing filter from the third television signal to output a fourth television signal;

a digital-analog converter that converts the fourth television signal into an analog television signal as a fifth television signal; and a control circuit that detects a reference signal in the second television signal for removing ghosts from the second and third television signals, detects an amplitude of noise in the reference signal, and controls a weighting factor for a filter factor for at least one of the waveform equalizing filter and the ghost reduction filter, wherein the weighting factor for the filter factor is based on the amplitude of noise detected in the reference signal;

wherein said control circuit further receives an ideal ghost removal reference signal, and magnifies the ideal ghost removal reference signal based on the amplitude of noise in the reference signal to obtain a magnified ideal ghost removal reference signal, wherein the weighting factor for the filter factor is further based on the magnified ideal ghost removal reference signal.

* * * * *